United States Patent [19]

McCreary

[11] Patent Number: 4,987,984
[45] Date of Patent: Jan. 29, 1991

[54] CAM RACE FOR A ROLLER CLUTCH

[75] Inventor: Charles H. McCreary, Oak Park, Ill.

[73] Assignee: General Motors Corporation, Detroit, Mich.

[21] Appl. No.: 463,700

[22] Filed: Jan. 11, 1990

[51] Int. Cl.⁵ .............................................. F16D 41/06
[52] U.S. Cl. .................................... 192/45; 188/82.84
[58] Field of Search ....................... 192/45; 188/82.84

[56]  References Cited

U.S. PATENT DOCUMENTS

| 3,249,186 | 5/1966 | Kluwe | 192/45 |
| 4,719,818 | 1/1988 | McCreary | 74/750 R |

FOREIGN PATENT DOCUMENTS

| 373337 | 7/1939 | Italy | 192/45 |
| 293396 | 8/1929 | United Kingdom | 192/45 |
| 744998 | 2/1956 | United Kingdom | 192/45 |

Primary Examiner—Richard Lorence
Attorney, Agent, or Firm—Patrick M. Griffin

[57] ABSTRACT

A cam slot type cam race for a roller clutch has an improved corner transition between the ends of the cam ramps and the bordering side walls comprised of an astroid type curve that creates a smooth, low stress area, but which removes less material than the equivalent circular arc.

3 Claims, 2 Drawing Sheets

CAM RACE FOR A ROLLER CLUTCH

This invention relates to roller clutches in general, and specifically to an improved cam race for a roller clutch.

BACKGROUND OF THE INVENTION

Overrunning roller clutches are used in a wide variety of applications where it is desired to selectively transfer power between a pair of relatively rotatable members. Every such clutch has a complement of rollers, each of which rides on a sloped cam ramp machined into one of the rotatable members, generally known as a cam race. Each roller is retained in an individual pocket, which may be part of a separate cage structure mounted to the cam race. Another type of clutch, sometimes referred to as a leg type clutch, has no separate cage, but instead retains each roller in an individual cam slot machined directly into the cam race. Each cam slot is basically U-shaped, with the bottom surface comprising the sloped cam ramp, and with two side walls that confine the rollers within the cam slot.

Since it is necessary to machine the cam ramp as accurately as possible, the ends of the cam ramp will generally be offset from the side walls of the cam slot in order to leave machining clearance. Therefore, some type of corner transition is needed between the ends of the cam ramp and the respective side walls of the cam slot. The two obvious choices are a sharp corner or a circular arc. The former is undesirable because of the stress concentrations that can occur at a sharp corner. A circular arc smoothes out stress well, and is easy to machine. However, in some applications, especially high load ones, a circular arc serving as a corner transition may entail removing more material from the cam race than is desirable.

SUMMARY OF THE INVENTION

The invention provides a roller clutch with a cam slot type cam race in which the corner transition is smooth and low stress, but is specially designed to remove a minimal amount of material.

In the preferred embodiment disclosed, the roller clutch has an inner cam race, machined from an annular steel ring. Each of a plurality of cam slots machined into the outboard edge of the cam race includes a shallow angle cam ramp bordered by a pair of side walls. The cam ramp has a predetermined end to end length sufficient to allow a roller its necessary travel path during clutch operation, with the bordering side walls acting to confine the roller. The corner transition from the end of each cam ramp to its respective side wall designed to be a smooth and low stress as the equivalent circular arc, but to remove less material.

Rather than a circular arc, the corner transition in the preferred embodiment of the invention is constructed, for the most part, as a hypocycloid curve. Specifically, an intermediate point is chosen that is close to, but located slightly below an end point of the cam ramp. Then, a hypocycloid curve, specifically an astroid curve, is constructed of a size sufficient to intersect the intermediate point as well as to be tangent to the respective cam slot side wall. A short circular arc of a size and shape suitable to be tangent to the astroid curve at the intermediate point and to intersect the end point of the cam ramp completes the corner transition. This is done at each end of the cam ramp. The astroid curve provides the same good dispersal of stresses that the equivalent circular arc would, but removes less cam race material, giving a stronger structure. By providing the short circular arc between the intermediate point and the end point of the cam ramp, some allowance is left for grinding the surface of the cam ramp without cutting into the astroid curve itself.

It is, therefore, a general object of the invention, in a roller clutch with a cam slot type cam race, to provide improved corner transitions between the ends of the cam ramps and the bordering side walls.

It is another object of the invention to provide such a corner transition that consists basically of a hypocycloid curve tangent to each side wall and intersecting near the end of a cam ramp, so as to provide good stress dispersal while removing less material than the equivalent circular arc.

It is another object of the invention to provide such a corner transition that also has a short circular arc at the end point of the cam ramp, so as to leave grinding clearance for the cam ramp.

It is still another object of the invention to provide a method for producing such an improved corner transition.

DESCRIPTION OF THE PREFERRED EMBODIMENT

These and other objects and features of the invention will appear from the following written description, and from the drawings, in which.

Figure 3:
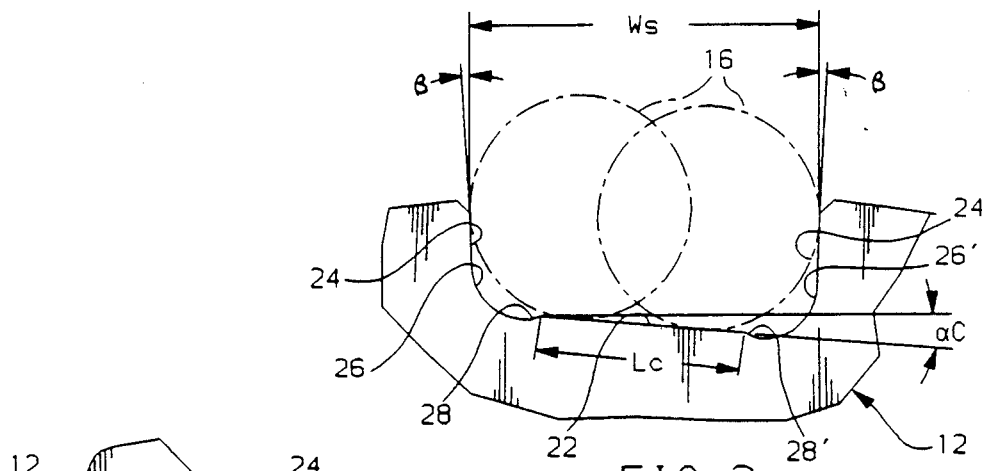
Figure 4:
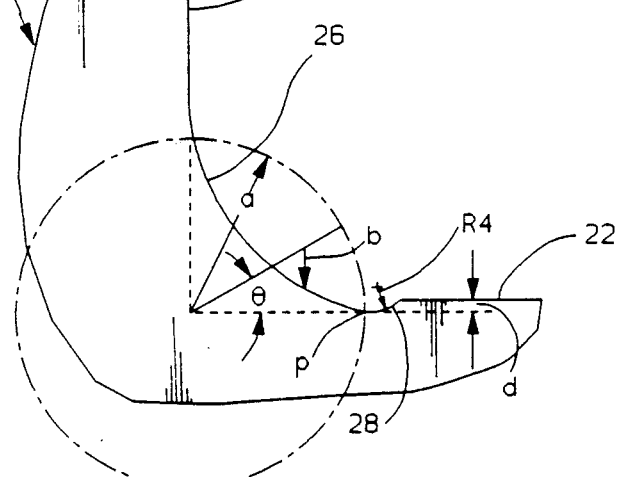
Figure 5:
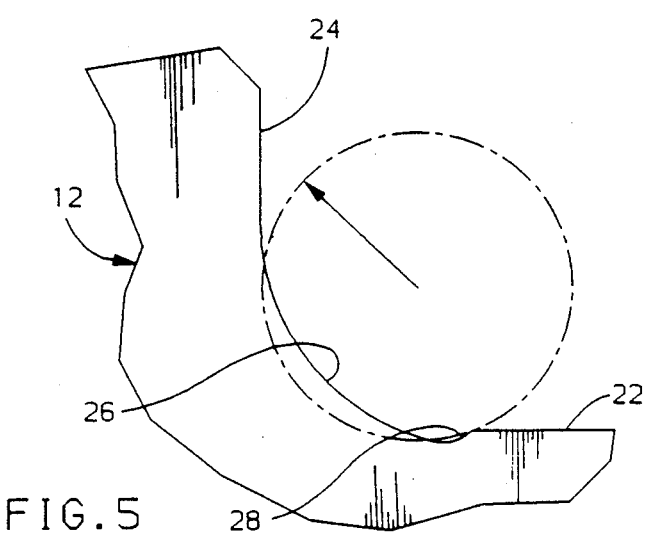

FIG. 3 an enlarged view of a single cam slot showing the two extreme roller positions in dotted lines;

FIG. 4 is an enlarged view of a corner transition, showing the method of its construction, FIG. 5 is a view similar to 4, but showing the equivalent circular arc corner transition in dotted lines, for purposes of comparison.

Figure 1:
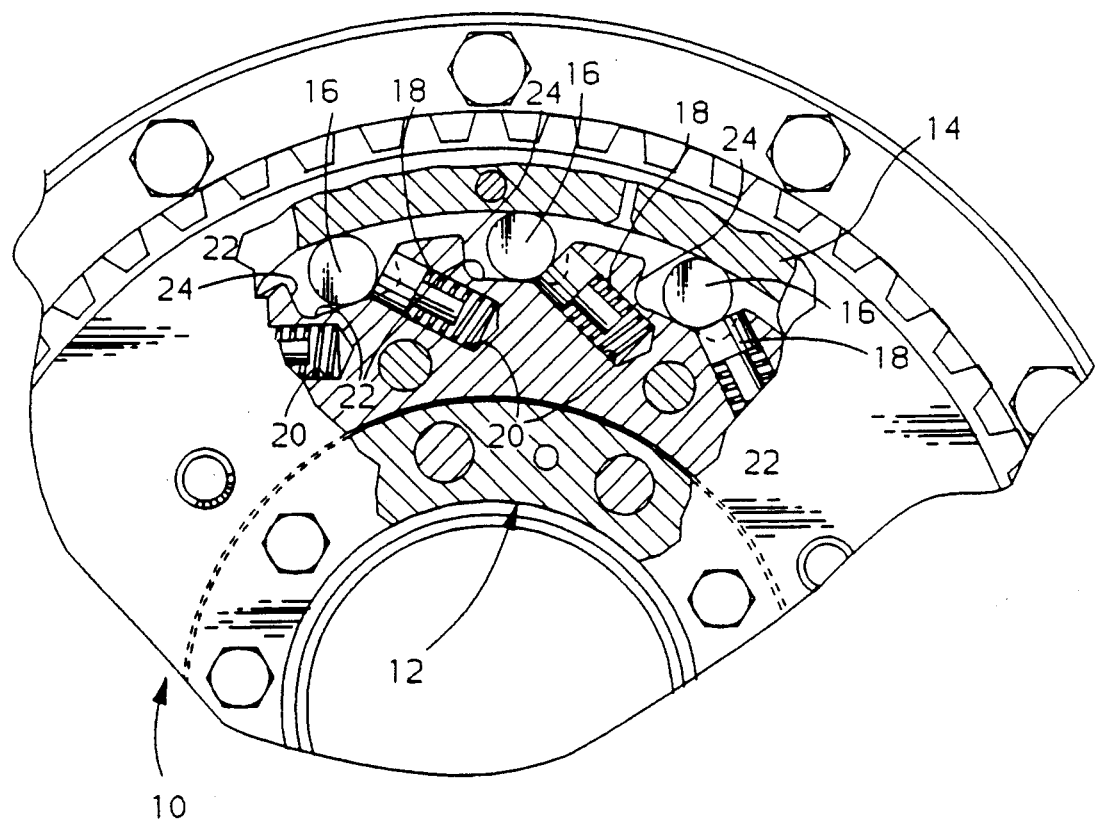
FIG. 1 is a partial end view of a roller clutch incorporating the improved cam race of the invention, broken away in part to expose components of the clutch to view.
Figure 2:
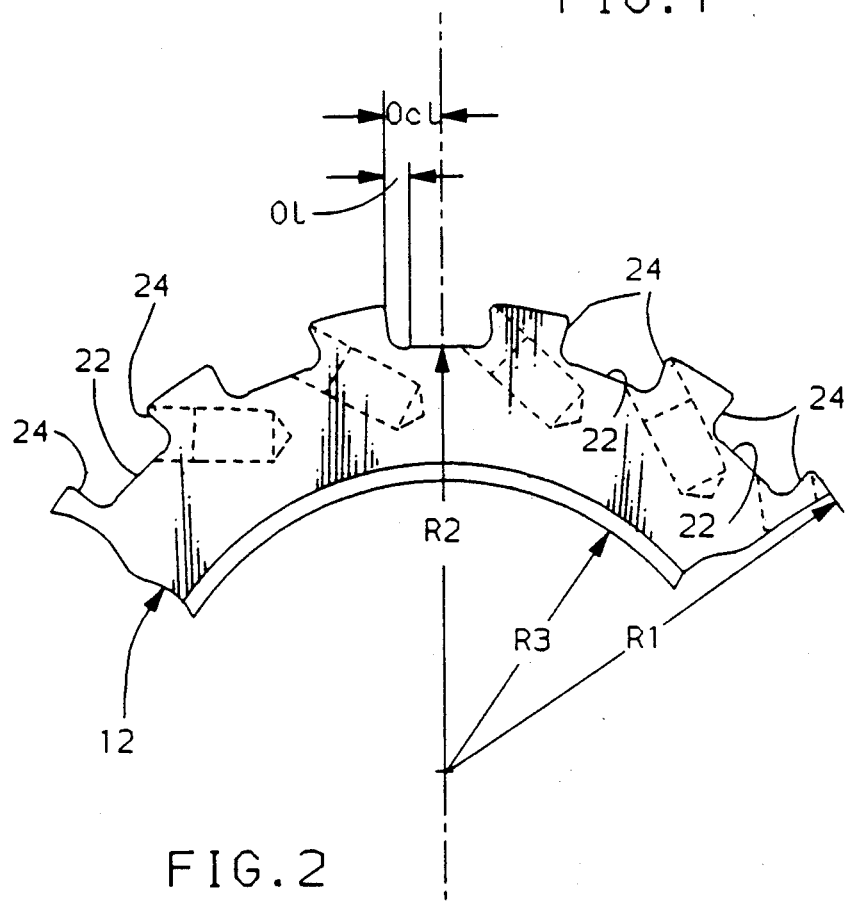
FIG. 2 is a view of a portion of the cam race indicating various dimensions of the race and cam slots.

Referring first to FIGS. 1 and 2, a roller clutch incorporating a preferred embodiment of the invention is indicated generally at 10. Clutch 10 is the leg or cam slot type, with an inner cam race, indicated generally at 12, and an outer pathway race 14, each machined from a suitable steel. Cam race 12 is basically annular in shape, with an outer radius R1 of 3.69 in. and an inner radius R3 of 2.45 in. Each of a plurality of eighteen steel cylindrical rollers 16, which are approximately 0.5 in. in diameter, is loaded leftward by a spring 18 set into a spring socket 20. The rollers 16 serve to impart a selective relative rotation between races 12 and 14 in a manner well known to those skilled in the art. Each roller 16 sits in a cam slot machined evenly into the outer edge of cam race 12, each of which has a basic U shape comprised of a sloped cam ramp 22 bordered by a pair of side walls 24. Details of the cam slot structure are given next.

Referring next to FIGS. 2 and 3, each cam ramp 22 is flat, with a predetermined end to end length, Lc, of 0.44 in. and an angle, $\alpha C$, of 4.6 degrees. The side walls 24 are substantially perpendicular to the cam ramp 22, but not exactly, since the camp ramp 22 is sloped. The side walls 24 do not lie directly on radial planes of the the cam race 12, but are tipped outboard thereof by a small angle, β, of approximately 3 degrees. The upper corners of each side wall 24 are chamfered at about 45 degrees. The greatest separation of the side walls 24, indicated at Ws, is 0.80 inches, so there is a substantial potential circumferential clearance between the ends of the cam ramp 22 and the side walls 24. That clearance provides room for accurately machining the cam ramp 22, and allows the side walls 24 to act as positive stops for the roller 16, the two limit positions of which are indicated in dotted lines in FIG. 3. Specifically, the offset of the left hand side wall 24 from a radial plane that bisects the cam slot, Ocl, is 0.40 in., while the offset of the left hand end of the cam ramp 22 from the left hand side wall 24, Ol, is 0.14 in. The radius of the center of the cam ramp 22 from the center line of cam race 12, R2, is 3.38 in. These dimensions describe everything but the corner transition from cam ramp 22 to side walls 24, which is described next.

Referring next to FIG. 4, a detailed explanation of the process by which the left hand corner transition is determined is given. First, an origin with vertical and horizontal axis, indicated in dotted lines, is established. The vertical axis is determined by the plane of the left side wall 24. The horizontal axis runs slightly below, rather than directly to, the left hand end of cam ramp 22. How much below is somewhat arbitrary, depending basically on how much grinding clearance for the ramp 22 the designer cares to leave. Here, that clearance, "d", is approximately 0.010 in. Next, a reference circle, shown in dotted lines, is established at the origin, with sufficient radius "a" to intersect the respective side wall 24, but not the end point of the cam ramp 22. Again, how much the reference circle "misses" the left hand end of the cam ramp 22 is fairly arbitrary, but it does miss, in the embodiment disclosed. Here, "a" is chosen to be 0.09 in., but it should be kept in mind that it could be larger, and FIG. 4 is not intended to be perfectly to scale in terms of how Ol relates visually to "a".

Still referring to FIG. 4, the next step is the generation of an astroid curve, also know as a hypocycloid of four cusps. This is generated within the reference circle by rolling a generating circle of radius "b", which is ¼ of "a", on the inside of the reference circle. This creates the astroid curve 26 shown, which runs from the point where it is tangent to the side wall 24 to an intermediate point P, where it is tangent to the horizontal dotted line axis. The point P is termed intermediate because it does not lie directly on the left hand end of cam ramp 22, but below and to the left of it. The astroid curve 26 would not be literally generated, of course, but could be computed from the formula $x = a\cos^3(\theta)$ and $y = a\sin^3(\theta)$, where $\theta$ is the angle through which the radius vector from the origin of the reference circle to the center of the generating circle has turned. This would likely be done by computer. A designer could manually determine a desired radius "a" for the reference circle by laying out a scale drawing and measuring, however. The astroid curve 26 comprises the majority of the corner transition surface. The rest is formed by a short circular arc 28 of radius R4 sufficient to be substantially tangent to the curve 26 at the intermediate point P, and to intersect the left hand end of cam ramp 22. Here, the arc 28 has a radius of 0.062 inches, and an arc length of approximately 32 degrees. The same process would be carried out for the right hand end of cam ramp 22, but some of the parameters would be different. Specifically, "a" for the right hand astroid curve would be 0.13 in., while R4 and "d" for the short circular arc would be the same. The arc length on the right hand side would be approximately 34 degrees. The equivalent parts of the right hand side transition are numbered 26′ and 28′ accordingly. The process of generation would be the same, however.

Referring next to FIGS. 2 and 5, the advantages and objectives of the corner transition surface so generated may be understood. The astroid curve 26 is, like a circular arc, smooth and adept at distributing stresses. It may be fairly easily machined, which, in this case, is done by a hobbing process. But, curve 26 has a great advantage over a conventional circular arc of equivalent size. Such an arc is shown in FIG. 5 in dotted lines. It is tangent to the side wall 24, and ends near the left hand end point of cam ramp 22. It may be easily seen that it cuts out significantly more material than the invention, which would give a weaker corner transition. The application in which the cam race 12 is intended to be used, a locomotive turbo charger, is one in which high loads are seen, so it is important to make the corner transition as strong as possible. This is especially true since as shown in FIG. 2, the spring socket 20 is drilled into the center of the right hand corner transition, which inevitably removes some material. The short arc 28 elevates the cam ramp 22 above the end of the astroid curve 26, in effect, and leaves clearance for a final grind on the surface of cam ramp 22 without interfering with the curve 26. The astroid curve 26 could have been taken directly to the end point of the cam ramp 22, however, by establishing the reference circle to intersect it. Therefore, it will be understood that the invention is capable of being embodied in structures other than that disclosed, and is not intended to be so limited.

Variations of the preferred embodiment could be made. A hypocycloid curve other than an astroid curve could be used in a situation where the side wall 24 and cam ramp 22 subtended an angle significantly larger than 90 degrees, unlike the disclosed embodiment, where they are nearly perpendicular. For example, if the angle were larger, and closer to 120 degrees, than a hypocycloid curve in which the radius "b" was ⅓ of "a" would make a good fit. A corner transition so generated would still remove less material than the equivalent circular arc. Alternately, the astroid curve 26 could have been taken directly to the end point of the cam ramp 22, by establishing the reference circle as to intersect it. Therefore, it will be understood that the invention is capable of being embodied in structures other than that disclosed, and is not intended to be so limited.

What is claimed is:

1. In a roller clutch of the type having a cam race with a plurality of cam slots machined therein, each cam slot comprising a cam ramp of predetermined length and bordered by a pair of side walls circumferentially spaced from said end points, an improved corner transition, between said cam ramp and at least one side wall, comprising,
   an astroid curve machined into said cam race so as to be tangent to a respective side wall,
   whereby less cam race material is removed to form said corner transition than an equivalent circular arc.

2. In a roller clutch of the type having a cam race with a plurality of cam slots machined therein, each cam slot comprising a cam ramp of predetermined length measured between two end points and bordered by a pair of side walls circumferentially spaced from said end points, an improved corner transition between said cam ramp end points and side walls, comprising,
- an astroid curve machined into said cam race so as to both intersect an intermediate point spaced from and below a respective cam ramp end point and be tangent to a respective side wall, and,
- a circular arc tangent to said astroid curve at said intermediate point and intersecting said respective cam ramp end point,
- whereby less cam race material is removed to form said corner transition than an equivalent circular arc, while said cam ramp may be machined down slightly without interfering with said astroid curve.

3. For use in a roller clutch, a cam race comprising,
- an annular ring having a plurality of cam slots machined therein, each cam slot comprising a cam ramp of predetermined length measured between two end points and bordered by a pair of side walls circumferentially spaced from said end points, and,
- an astroid curve machined into said cam race so as to both intersect an intermediate point spaced from and below a respective cam ramp end point and be tangent to a respective side wall, and,
- a circular arc tangent to said astroid curve at said intermediate point and intersecting said respective cam ramp end point,
- whereby less cam race material is removed to form said corner transition than an equivalent circular arc, while said cam ramp may be machined down slightly without interfering with said astroid curve.

* * * * *